United States Patent
Wang et al.

(10) Patent No.: US 11,720,949 B2
(45) Date of Patent: Aug. 8, 2023

(54) METHOD AND DEVICE FOR RECOMMENDING GIFT AND MOBILE TERMINAL

(71) Applicant: HONG KONG LIVEME CORPORATION LIMITED, Hong Kong (CN)

(72) Inventors: Chenying Wang, Beijing (CN); He Li, Beijing (CN); Wenpei Hou, Beijing (CN); Diqin Jiao, Beijing (CN)

(73) Assignee: JOYME PTE. LTD, Singapore (SG)

( * ) Notice: Subject to any disclaimer, the term of this patent is extended or adjusted under 35 U.S.C. 154(b) by 583 days.

(21) Appl. No.: 16/473,349

(22) PCT Filed: Nov. 3, 2017

(86) PCT No.: PCT/CN2017/109356
§ 371 (c)(1),
(2) Date: Jun. 25, 2019

(87) PCT Pub. No.: WO2018/121065
PCT Pub. Date: Jul. 5, 2018

(65) Prior Publication Data
US 2020/0143447 A1    May 7, 2020

(30) Foreign Application Priority Data
Dec. 26, 2016 (CN) .......................... 201611220626.9

(51) Int. Cl.
*G06Q 30/0601* (2023.01)
*G06Q 20/12* (2012.01)
(Continued)

(52) U.S. Cl.
CPC ....... *G06Q 30/0631* (2013.01); *G06Q 20/123* (2013.01); *G06Q 20/3678* (2013.01); *H04L 65/611* (2022.05)

(58) Field of Classification Search
CPC ............. G06Q 30/0631; G06Q 20/123; G06Q 20/3678; G06Q 20/322; G06Q 20/3274;
(Continued)

(56) References Cited

U.S. PATENT DOCUMENTS 10,484,439 B2 * 11/2019 Oates, III ............. H04N 21/472
2011/0202615 A1 * 8/2011 Fletcher ............. G06Q 30/0279
709/206
(Continued)

FOREIGN PATENT DOCUMENTS

CN     105335051 A   *  2/2016   ......... G06Q 30/0212
CN     105335051 A      2/2016
(Continued)

OTHER PUBLICATIONS

Office Action for Chinese Application No. 201611220626.9 (with English Translation, 8 pages).
(Continued)

*Primary Examiner* — Michael Jared Walker
(74) *Attorney, Agent, or Firm* — Lippes Mathias LLP

(57) ABSTRACT

A method and a device for recommending a virtual gift for a live show, and a mobile terminal are disclosed. The method includes: receiving a clicking instruction from a user on a gift list of a live show; determining a gift category according to the clicking instruction; generating an interface for editing virtual gifts according to the gift category; receiving an input content input by the user via the interface for editing virtual gifts; and recommending and generating a virtual gift according to the input content.

15 Claims, 13 Drawing Sheets

(51) Int. Cl.
*G06Q 20/36* (2012.01)
*H04L 65/611* (2022.01)

(58) Field of Classification Search
CPC .............. G06Q 20/387; G06Q 30/0212; H04L 65/4076; G07F 17/16; G07F 17/40; G07F 9/0235; G06F 16/9535
See application file for complete search history.

(56) References Cited

U.S. PATENT DOCUMENTS

| | | | |
|---|---|---|---|
| 2016/0006981 A1* | 1/2016 | Bauman | H04N 7/147 705/26.3 |
| 2016/0035182 A1* | 2/2016 | Kruglick | H04L 67/1063 463/29 |
| 2016/0294894 A1* | 10/2016 | Miller | G06F 16/24578 |
| 2018/0012308 A1* | 1/2018 | Zha | G06Q 30/0236 |

FOREIGN PATENT DOCUMENTS

| | | | |
|---|---|---|---|
| CN | 105337843 A | | 2/2016 |
| CN | 106210855 A | * | 12/2016 |
| CN | 106210855 A | | 12/2016 |
| CN | 106709762 A | | 5/2017 |

OTHER PUBLICATIONS

International Search Report for PCT/CN2017/109356, dated Jan. 16, 2016, 4 pages.

* cited by examiner

US 11,720,949 B2

METHOD AND DEVICE FOR RECOMMENDING GIFT AND MOBILE TERMINAL

CROSS-REFERENCE TO RELATED APPLICATION

This application is a US national application of International Application No. PCT/CN2017/109356, filed on Nov. 3, 2017, which claims priority to Chinese Patent Application No. 201611220626.9, and filed on Dec. 26, 2016, the entire contents of which are incorporated herein by reference.

FIELD

The present disclosure relates to a field of webcast platform technologies, and more particularly to a method and a device for recommending a virtual gift for a live show, and a mobile terminal.

BACKGROUND

With the development of the Internet technology, live shows become more and more popular among public. For example, the public may watch various live shows, such as, a live game, an entertainment program or the like, on a webcast platform (such as Tiger Tooth Live, Douyu Live, etc.).

Particularly, when a user is watching the live show, the user may give a virtual gift to a performer on the live show who is liked or supported by the user.

SUMMARY

Embodiments of a first aspect of the present disclosure provide a method for recommending a virtual gift for a live show. The method includes: receiving a clicking instruction from a user on a gift list of the live show; determining a gift category according to the clicking instruction; generating an interface for editing virtual gifts according to the gift category; receiving an input content input by the user through the interface for editing virtual gifts; and generating a virtual gift according to the input content.

Embodiments of a third aspect of the present disclosure provide a mobile terminal. The mobile terminal includes: a housing, a processor, a memory, a circuit board and a power circuit. The circuit board is enclosed by the housing. The processor and the memory are provided in the circuit board. The power circuit is configured to provide power for respective circuits and components of the mobile terminal. The memory is configured to store executable program codes. The processor is configured to execute programs corresponding to the executable program codes by reading the executable program codes stored in the memory, to execute following: receiving a clicking instruction from a user on a gift list of a live show; determining a gift category according to the clicking instruction; generating an interface for editing virtual gifts according to the gift category; receiving an input content input by the user through the interface for editing virtual gifts; and generating a virtual gift according to the input content.

Embodiments of a fourth aspect of the present disclosure provide a storage medium. The storage medium is configured to store an application. The application is configured to execute the method for recommending a virtual gift for a live show according to embodiments of the first aspect of the present disclosure when running.

Additional aspects and advantages of the present disclosure will be given in part in the following descriptions, and become apparent in part from the following descriptions, or be learned from the practice of the embodiments of the present disclosure.

BRIEF DESCRIPTION OF THE DRAWINGS

Above and/or additional aspects and advantages of the present disclosure will become apparent and more readily appreciated from the following descriptions made with reference to the drawings, in which.

DETAILED DESCRIPTION

Description will be made in detail below to embodiments of the present disclosure. Examples of embodiments are illustrated in the accompanying drawings. Throughout the present disclosure, the same or similar numbers represent the same or similar elements or elements with the same or similar functions. Embodiments described below with reference to the accompanying drawings are exemplary, which are intended to explain the present disclosure and cannot be construed a limitation of the present disclosure.

Figure 1A:
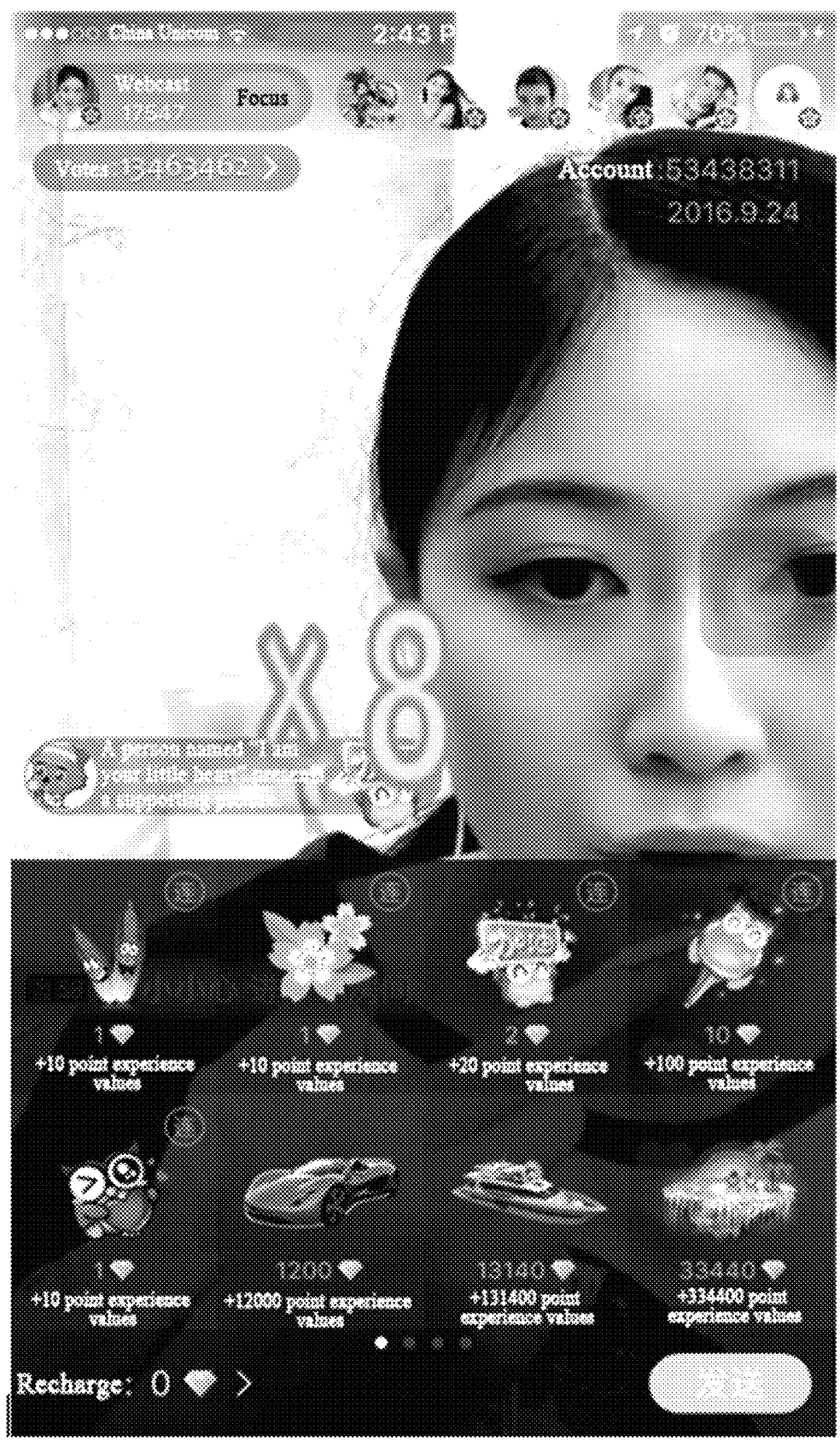
FIG. 1a-1c is a schematic diagram illustrating a displaying interfaces for pushing a virtual gift for a live show in related arts.
Figure 1B:
Figure 1C:
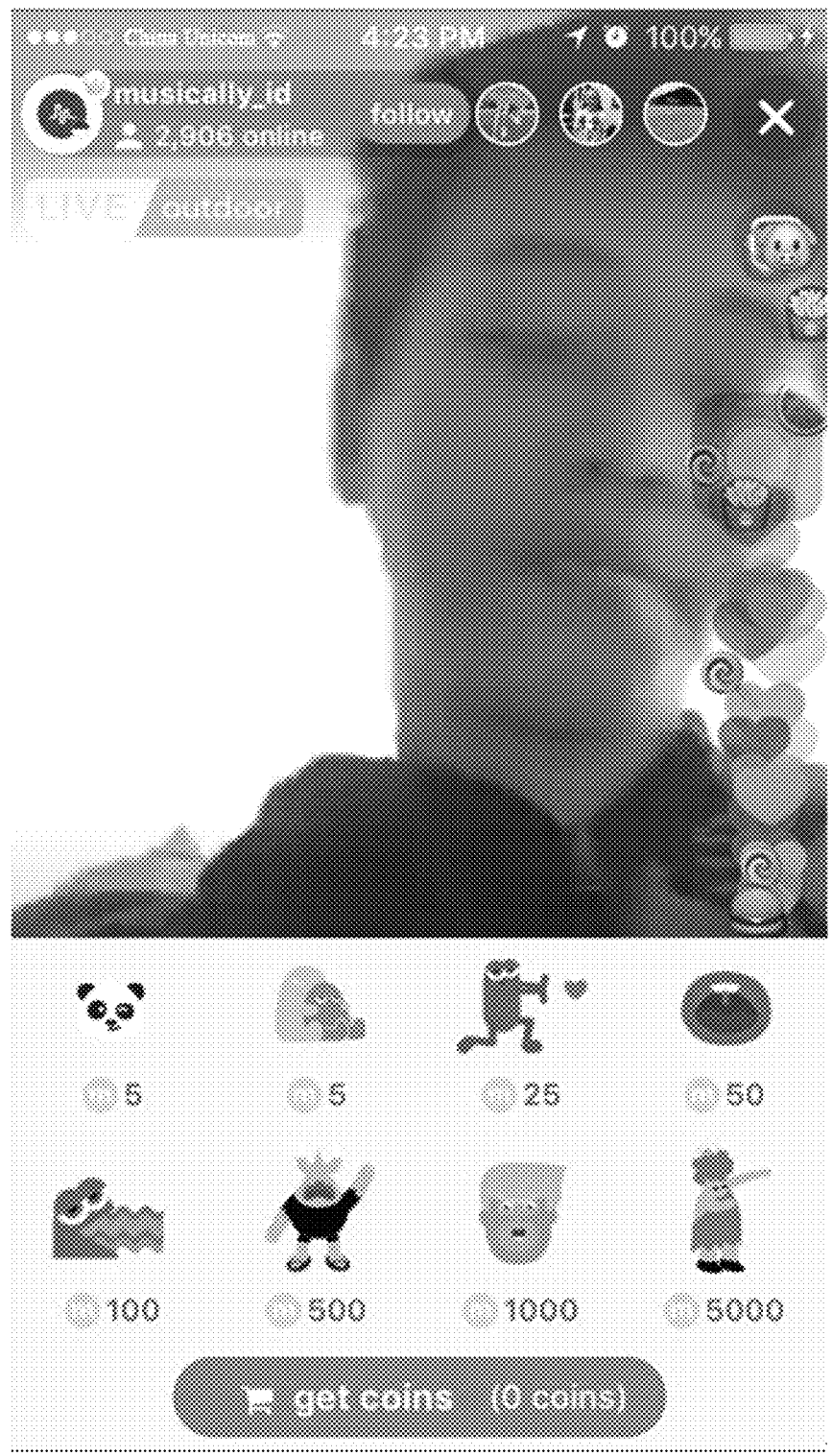

In related arts, a method for recommending a virtual gift for a live show may be usually implemented by following. For example, as illustrated in FIG. 1a-1c, an interface for selecting among a gift list is provided for the user by a mobile terminal. When it is detected that the user selects a gift via the interface for selecting among a gift list and sends a sending instruction by clicking a determination button, the gift selected by the user may be displayed on the screen showing the live show, such that the gift presenter, the performer and others may view the gift.

However, there are following problems existed. Both the amount and format of virtual gifts in the gift list provided by the mobile terminal for the user are limited. As a result, it is difficult to meet different emotional expressions for users. As the user becomes less fresh about the virtual gift, frequency and enthusiasm of using the virtual gift may decrease, thereby causing user's experience poor. In addition, positivity of the user for using a related product may be dampened, thereby reducing stickiness between the user and the related product.

A method for recommending a virtual gift for a live show provided according to embodiments of a first aspect of the present disclosure may be described below with reference to FIG. 2.

Figure 2:
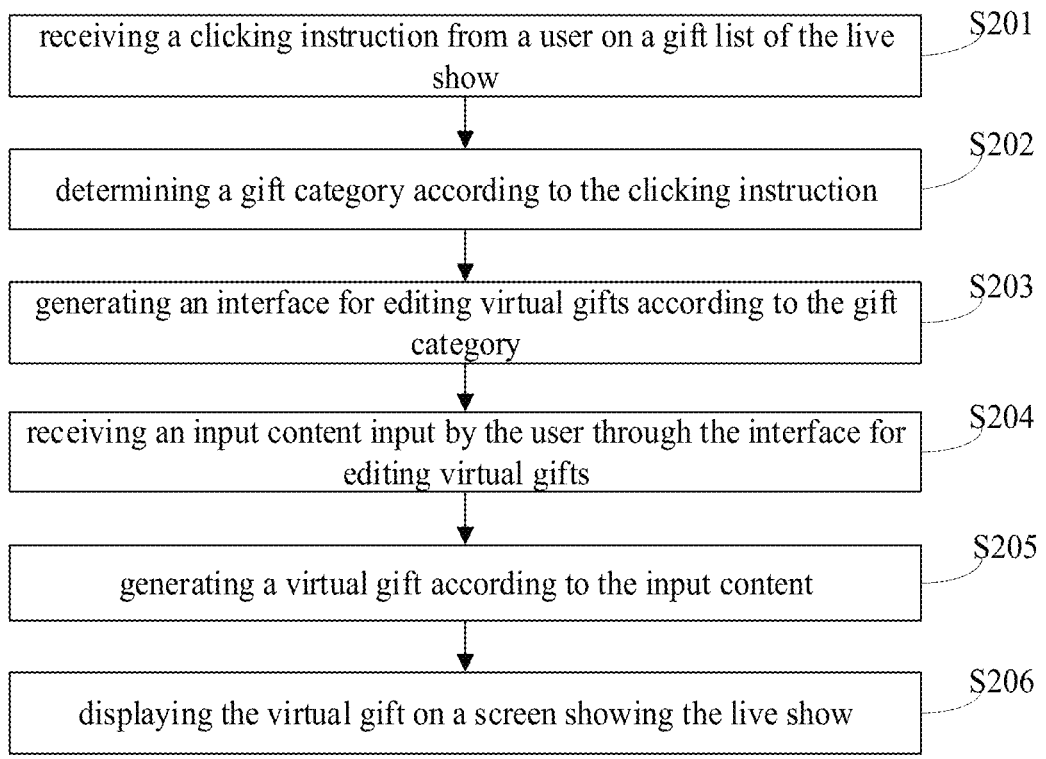
FIG. 2 is a flow chart illustrating a method for recommending a virtual gift for a live show according to an embodiment of the present disclosure.

FIG. 2 is a flow chart illustrating a method for recommending a virtual gift for a live show according to an embodiment of the present disclosure. As illustrated in FIG. 2, the method for recommending the virtual gift for the live show according to embodiments of the present disclosure includes following.

At block S201, a clicking instruction from a user on a gift list of the live show is received.

For example, it is assumed that the method for recommending the virtual gift for the live show according to embodiments of the present disclosure may be applied to a mobile terminal. The mobile terminal may provide an application of the live show for the user. The user may watch the live show through the application, and may give a gift to a performer when watching the live show, to show love and support to the performer. In order to realize interaction between the user and the performer, the mobile terminal may provide an entrance of virtual gifts for the user during the live show through the application. When it is detected that the user clicks and accesses the entrance of virtual gifts, a gift list may be provided to the user. The gift list has various categories of virtual gifts, such as, gift of a character category, gift of a static expression category, gift such as flowers, and the like. In the way, the user may click the gift list displayed on the interface showing the live show to give a gift to the performer when the user desires to give gifts to the performer.

It should be noted that, in embodiments of the present disclosure, the mobile terminal may be, but not limited to, a smart terminal having a network communication function, such as a smart phone, a personal digit assistant, a PC (personal computer), a table computer.

At block S202, a gift category is determined according to the clicking instruction.

It may be understood that, the gift list of the live show may have various categories of virtual gifts. In this way, the user may freely select the virtual gift according to his/her own needs. Therefore, when the clicking instruction from the user on the gift list of the live show is detected and a determination is made, the category of the gift selected by the user may be determined according to the clicking instruction.

The gift category may be a character-graphics gift category, and may also be a dynamic expression gift category. The above various gift categories may enable a selection by the user according to his/her own needs to meet different needs of the user.

At block S203, an interface for editing virtual gifts is generated according to the gift category.

In detail, after the gift category selected by the user is determined, the interface for editing virtual gifts may be generated according to the gift category. For example, the interface for editing virtual gifts may be generated in following ways, which is not limited thereto.

A first way: when the gift category selected by the user is the character-graphics gift category, an interface for editing virtual characters may be generated according to the character-graphics gift category. The interface for editing virtual characters may contain an input box and a plurality of character-graphics templates.

A second way: when the gift category selected by the user is a dynamic expression gift category, an interface for editing virtual dynamic expressions may be generated according to the dynamic expression gift category. The interface for editing virtual dynamic expressions may contain a plurality of dynamic expression templates.

Certainly, when the interface for editing virtual gifts is generated according to the gift category, an interface for editing virtual gifts of the character-graphics gift category and of the dynamic expression gift category in combination may be generated according to the character-graphics gift category and the dynamic expression gift category.

At block S204, an input content input by the user through the interface for editing virtual gifts is received.

In detail, after the interface for editing virtual gifts is generated according to the gift category, the interface for editing virtual gifts may be displayed on the screen showing the live show. The user may edit a selected gift through the interface for editing virtual gifts and input hits/her favorite content information. For example, when the selected gift category is the character-graphics gift category, the user may input character-typed content through the interface for editing virtual characters. As another example, when the selected gift category is the dynamic expression gift category, the user may input dynamic-expression-typed content in the interface for editing virtual dynamic expressions. Certainly, a gift combined of the character and the dynamic expression may also be selected, and the user may provide inputs through the interface for editing virtual gifts in combination, such that the user may provide corresponding content according to the user's feeling or a scene.

At block S205, a virtual gift is generated according to the input content.

As an example, the interface for editing virtual gifts may also provide a preview function of the virtual gifts to the user. For example, a preview button may be provided on the interface for editing virtual gifts. After it is detected that the user inputs his/her favorite content to the interface for editing virtual gifts, and when it is determined that the user clicks the preview button, the generated virtual gift may be presented for preview on the interface for editing virtual gifts. As another example, at same time when it is detected that the user inputs his/her favorite content on the interface for editing virtual gifts, generation of the virtual gift with the input may be displayed on the interface for editing virtual gifts, to realize a real-time preview function. Therefore, it is possible to secondarily edit an edited gift in real time until the gift is satisfied by the user, when the user does not satisfy with the edited gift. Further, the user may click a save button on the interface for editing virtual gifts to save the generated virtual gift.

At block S206, the virtual gift is displayed on a screen showing the live show.

As an example, after the virtual gift is generated according to the input content, the virtual gift may be directly displayed on the screen showing the live show, such that the gift presenter, the performer and other users may see the virtual gift. As another example, after the virtual gift is generated according to the input content, and when a determination instruction on the virtual gift sent from the user is received, the virtual gift may be directly displayed on the screen showing the live show.

According to the method for recommending the virtual gift for the live show, by receiving the clicking instruction from the user on the gift list of the live show, determining the gift category according to the clicking instruction, generating the interface for editing virtual gifts according to the gift category, receiving the input content input by the user; and generating the virtual gift according to the input content, limited gift templates may be edited secondarily, to create a new virtual gift. Therefore, not only the gift format is enriched, but also the user is enabled to casually edit the gift template based on his/her own needs, thereby improving the user's experience, increasing the positivity of the user for using the related product and enhancing the stickiness between the user and the related product.

It should be illustrated that, the interface for editing virtual gifts may vary with the gift category. Thus, the virtual gift generated according to the input content on the interface for editing virtual gifts may also be different from each other. Further descriptions may be made below for a detailed procedure for generating the virtual gift when the gift category is the character-graphics gift category in combination with FIG. 3.

Figure 3:
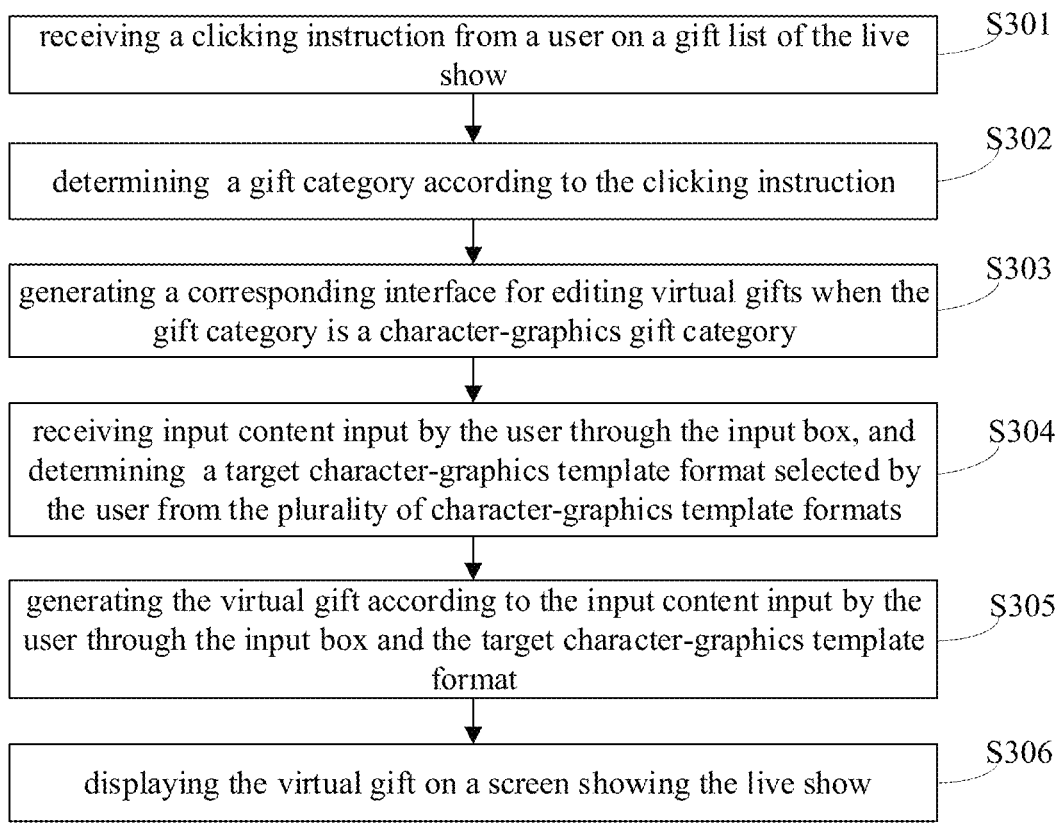
FIG. 3 is a flow chart illustrating a method for recommending a virtual gift for a live show according to another embodiment of the present disclosure.

FIG. 3 is a flow chart illustrating a method for recommending a virtual gift for a live show according to another embodiment of the present disclosure.

As illustrated in FIG. 3, the method for recommending the virtual gift for the live show may include following.

At block S301, a clicking instruction from a user on a gift list of the live show is received.

At block S302, a gift category is determined according to the clicking instruction.

At block S303, when the gift category is a character-graphics gift category, a corresponding interface for editing virtual gifts is generated.

The corresponding interface for editing virtual gifts may contain an input box and a plurality of character-graphics template formats.

It should be understood that, when it is determined that the gift category selected by the user is the character-graphics gift category, an interface for editing virtual characters may be generated and displayed on the screen showing the live show. The user may perform edition and selection operations through the input box and on the plurality of character-graphics template formats of the interface for editing virtual characters, thereby performing an operation according to his/her need. Therefore, the user may better express his/her favors.

At block S304, the input content input by the user through the input box is received, and a target character-graphics template format selected by the user from the plurality of character-graphics template formats is determined.

In detail, receiving the input content input by the user through the input box, and determining the target character-graphics template format from the plurality of character-graphics template formats may be implemented by following examples.

A first example: after it is determined that the user inputs content to the input box of the interface for editing virtual characters, the user may be prompted to select the target character-graphics template format from the plurality of character-graphics template format.

A second example: before the user performs content edition on the interface for editing virtual characters, the user may be prompted to select the target character-graphics template format from the plurality of character-graphics template formats, and the user may be prompted to input the content through the input box.

It should be understood that, the above implementations are merely exemplary, which are not construed as limitations of embodiments of the present disclosure.

It should be illustrated that, the content input by the user to the input box may be a character symbol, an English symbol, an emoji, or the like.

In order to protect network language civilization, in an embodiment of the present disclosure, a detailed procedure of receiving the input content input by the user through the input box may include following. The content input by the user to the input box may be filtered based on a rule, to determine the input content. For example, when the user inputs the content through the input box, sensitive words may be filtered out from the content. When it is detected that the content input by the user contains a sensitive word, the sensitive word may be filtered out from the content. For example, the sensitive word may be replaced by a default word. The content obtained after the filtering may be determined as the input content. A prompt message may be generated and provided to the user, to prompt the user that the content currently input contains sensitive information. Therefore, the civilized atmosphere of the live show platform may be ensured.

At block S305, the virtual gift is generated according to the input content input by the user through the input box and the target character-graphics template format.

As an example, the interface for editing virtual characters may also provide a preview function of the virtual gifts to the user. For example, a preview button may be provided on the interface for editing virtual characters. When it is detected that the user inputs his/her favorite content to the input box of the interface for editing virtual characters and determines the target character-graphics template format, the generated virtual gift may be displayed for preview on the interface for editing virtual characters when it is determined that the user clicks the preview button. As another example, at the same time when it is detected that the user inputs his/her favorite content to the interface for editing virtual gifts and determines the target character-graphics template format, generation of the virtual gift with the input may be displayed on the interface for editing virtual gifts in real time, to realize a real-time preview function. In this way, it is possible to secondarily edit an edited gift in real time until the gift is satisfied by the user, when the user does not satisfy with the edited gift. Further, the user may click a save button on the interface for editing virtual gifts to save the generated virtual gift.

It should be noted that, in order to ensure a good displaying effect of the gift on the interface, an upper limit of the number of characters may be 8.

At block S306, the virtual gift is displayed on a screen showing the live show.

Figure 5A:
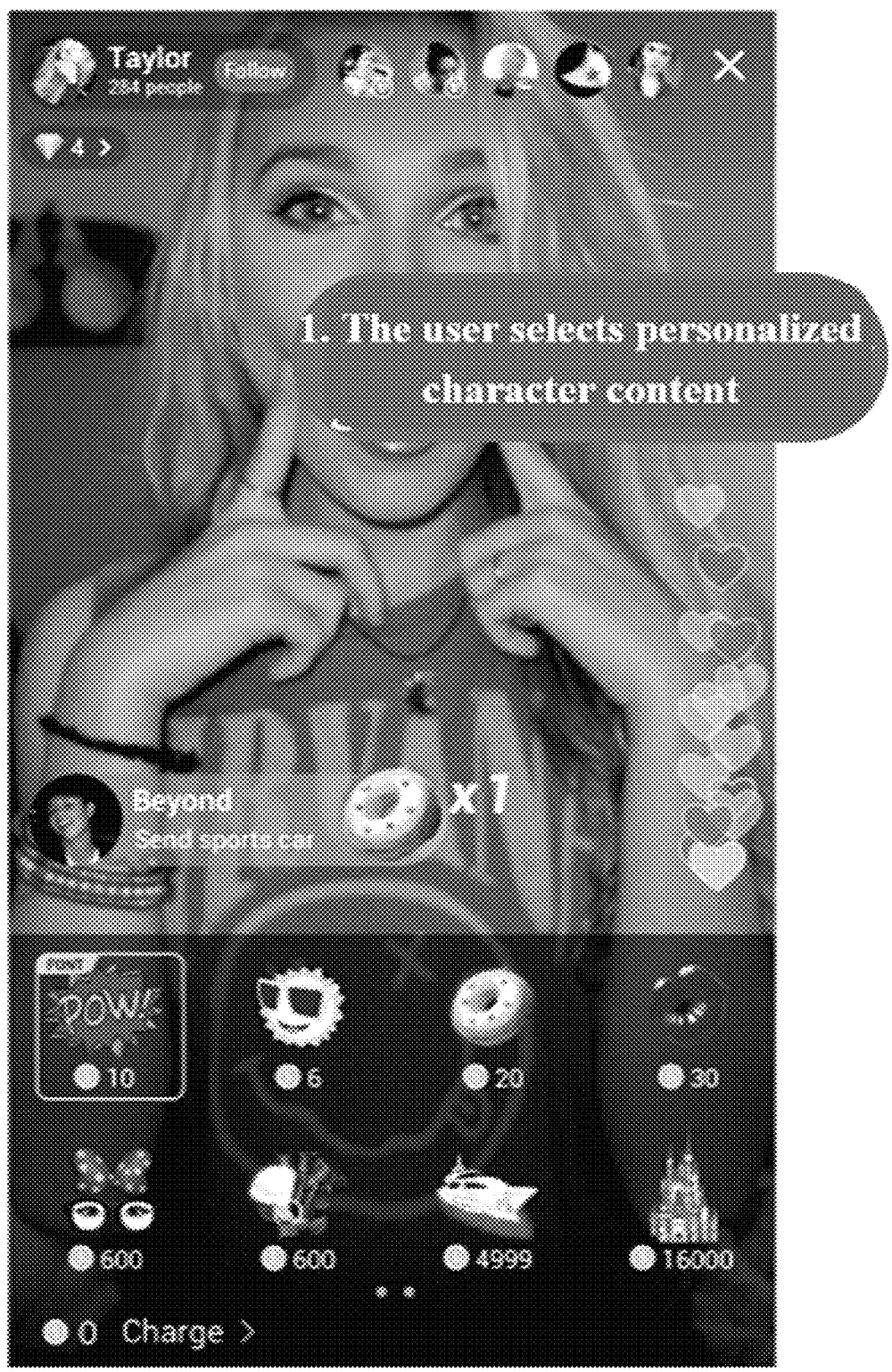
FIGS. 5a-5c are schematic diagrams illustrating generation of a virtual gift of a character-graphics category according to an embodiment of the present disclosure.
Figure 5B:
Figure 5C:
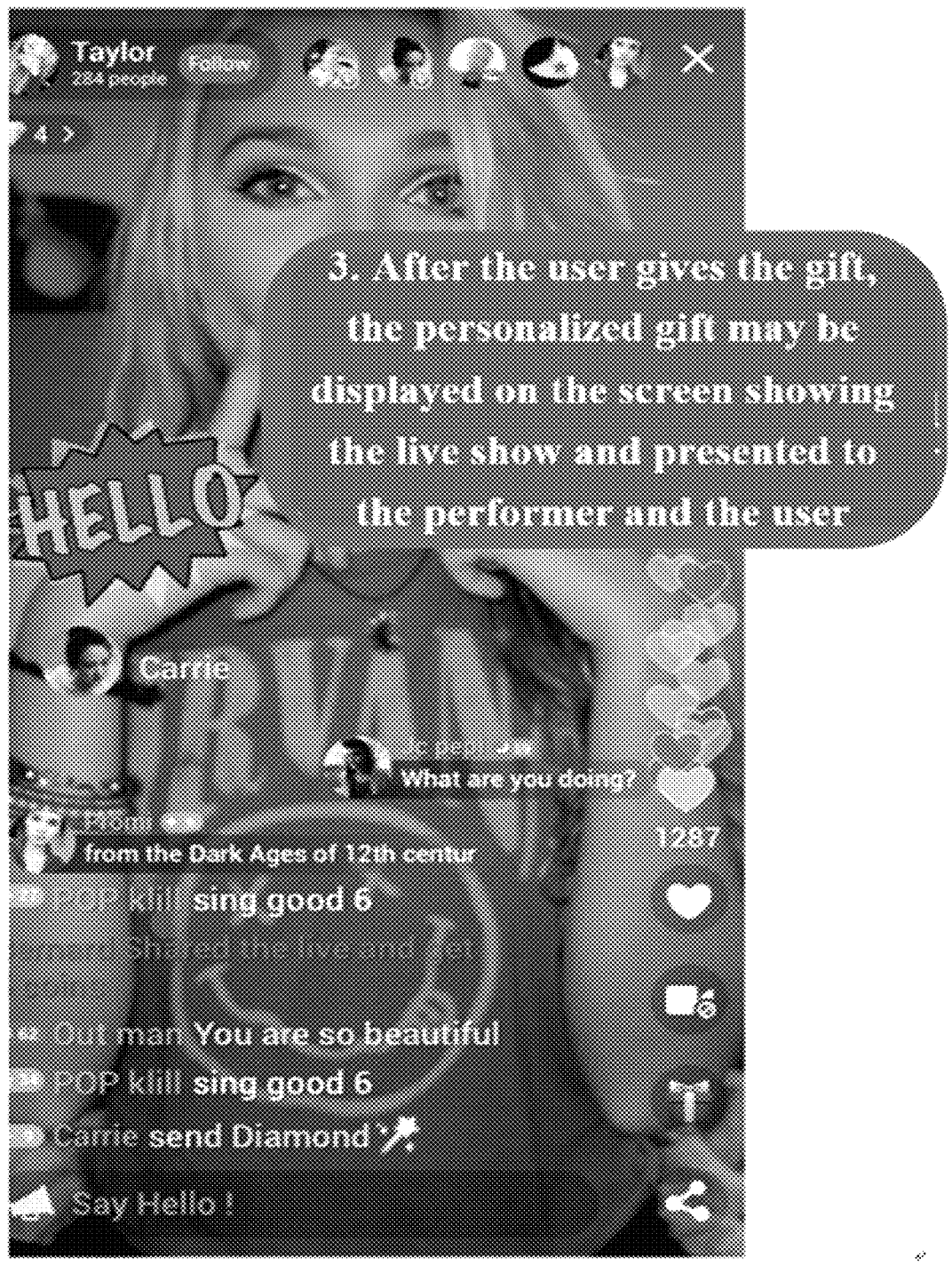

For example, when it is detected that the user clicks an entrance of gifts on an interface of the live show and accesses a gift list, and after the user selects a personalized character-graphics gift, a bouncing window may be automatically pushed on the interface for editing virtual gifts, including an input box of characters. The user may input his/her desired character to the input box. A gift preview may be provided above the input box, displaying the effect in real time for previewing by the user. The virtual gift may be generated after the user satisfies with the effect, and may be displayed on the screen showing the live show, as illustrated in FIGS. 5a-5c.

With the method for recommending the virtual gift for the live show according to embodiments of the present disclosure, the corresponding interface for editing virtual gifts may be generated according to the character-graphics gift category selected by the user. An edition operation is performed on the content input by the user and the selected target character-graphics format, such that the user may perform personalized edition according to his/her own needs, to generate a personalized gift carrying a unique feeling, thereby improving the user's experience, increasing the positivity of the user for using the related product and enhancing the stickiness between the user and the related product.

Figure 4:
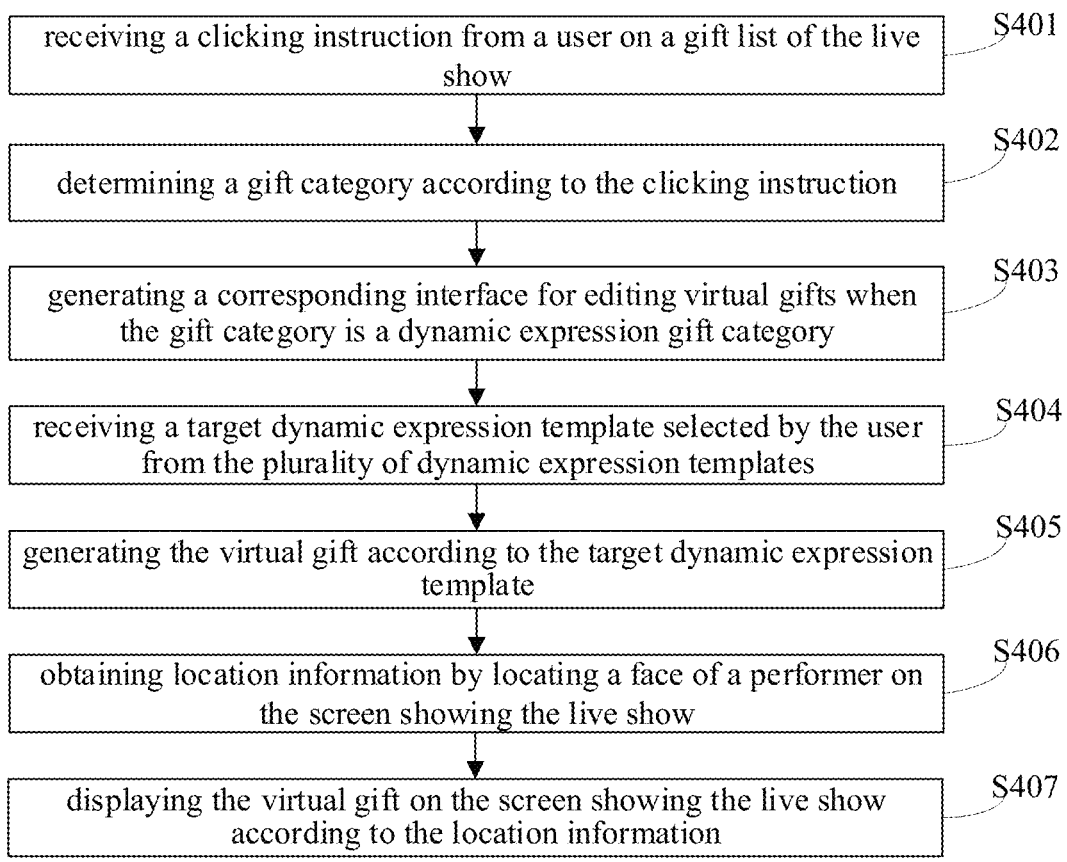
FIG. 4 is a flow chart illustrating a method for recommending a virtual gift for a live show according to still another embodiment of the present disclosure.

Further descriptions may be made below to a detailed procedure of generating the virtual gift when the gift category is the character-graphics gift category in combination with FIG. 4. FIG. 4 is a flow chart illustrating a method for recommending a virtual gift for a live show according to still another embodiment of the present disclosure. As illustrated in FIG. 4, the method for recommending the virtual gift for the live show may include the following.

At block S401, a clicking instruction from a user on a gift list of the live show is received.

At block S402, a gift category is determined according to the clicking instruction.

At block S403, when the gift category is a dynamic expression gift category, a corresponding interface for editing virtual gifts is generated.

The interface for editing virtual gifts may contain a plurality of dynamic expression templates.

It should be understood that, when it is determined that the gift category selected by the user is the dynamic expression gift category, an interface for editing virtual dynamic expressions may be generated. The interface for editing virtual dynamic expressions may be displayed on the screen showing the live show. The user may perform edition and selection operations on the plurality of dynamic expression templates displayed on the interface for editing virtual dynamic expressions. The user may perform an operation according to his/her need, such that the user may better express what the user wants to express.

At block S404, a target dynamic expression template selected by the user from the plurality of dynamic expression templates is received.

In detail, when it is determined that the user selects the target dynamic expression template, a block of generating the virtual gift may be performed according to the target dynamic expression template selected by the user. When the user selects the target dynamic expression template, the user may perform the selection based on the user's feeling. For example, when the user desires to express happiness, the user may select a dynamic expression of smiling. As another example, when the user desires to express sadness, the user may select a dynamic expression of crying.

At block S405, the virtual gift is generated according to the target dynamic expression template.

As an example, the interface for editing virtual dynamic expressions may also provide a preview function of the virtual gifts to the user. For example, a preview button may be provided on the interface for editing virtual dynamic expressions. When it is detected that the target dynamic expression template is determined by the user on the interface for editing virtual dynamic expressions, and when the user clicks the preview button, the generated virtual gift may be displayed on the interface for editing virtual dynamic expressions for preview. As another example, at same time when it is detected that the user determines the target dynamic expression template on the interface for editing virtual dynamic expressions, the generation of the virtual gift with input may be displayed on the interface for editing virtual dynamic expressions in real time, to realize a real-time preview function. In this way, it is possible to secondarily edit an edited gift in real time until the gift is satisfied by the user, when the user does not satisfy with the edited gift. Further, the user may click a save button on the interface for editing virtual gifts to save the generated virtual gift.

At block S406, location information is obtained by locating a face on the screen showing the live show.

In detail, in an embodiment of the present disclosure, the face of the performer may be located on the screen showing the live show using coordinate information of the face of the performer on the screen showing the live show, to obtain the location information.

At block S407, the virtual gift is displayed on the screen showing the live show according to the location information.

As an example, after the virtual gift is generated, the location information may be obtained by locating the face of the performer on the screen showing the live show, and the virtual gift may be displayed on the screen showing the live show according to the location information. As another example, after the virtual gift is generated according to the input content, and when a determination instruction of the virtual gift sent from the user is received, the virtual gift may be directly displayed on the screen showing the live show.

Figure 6A:
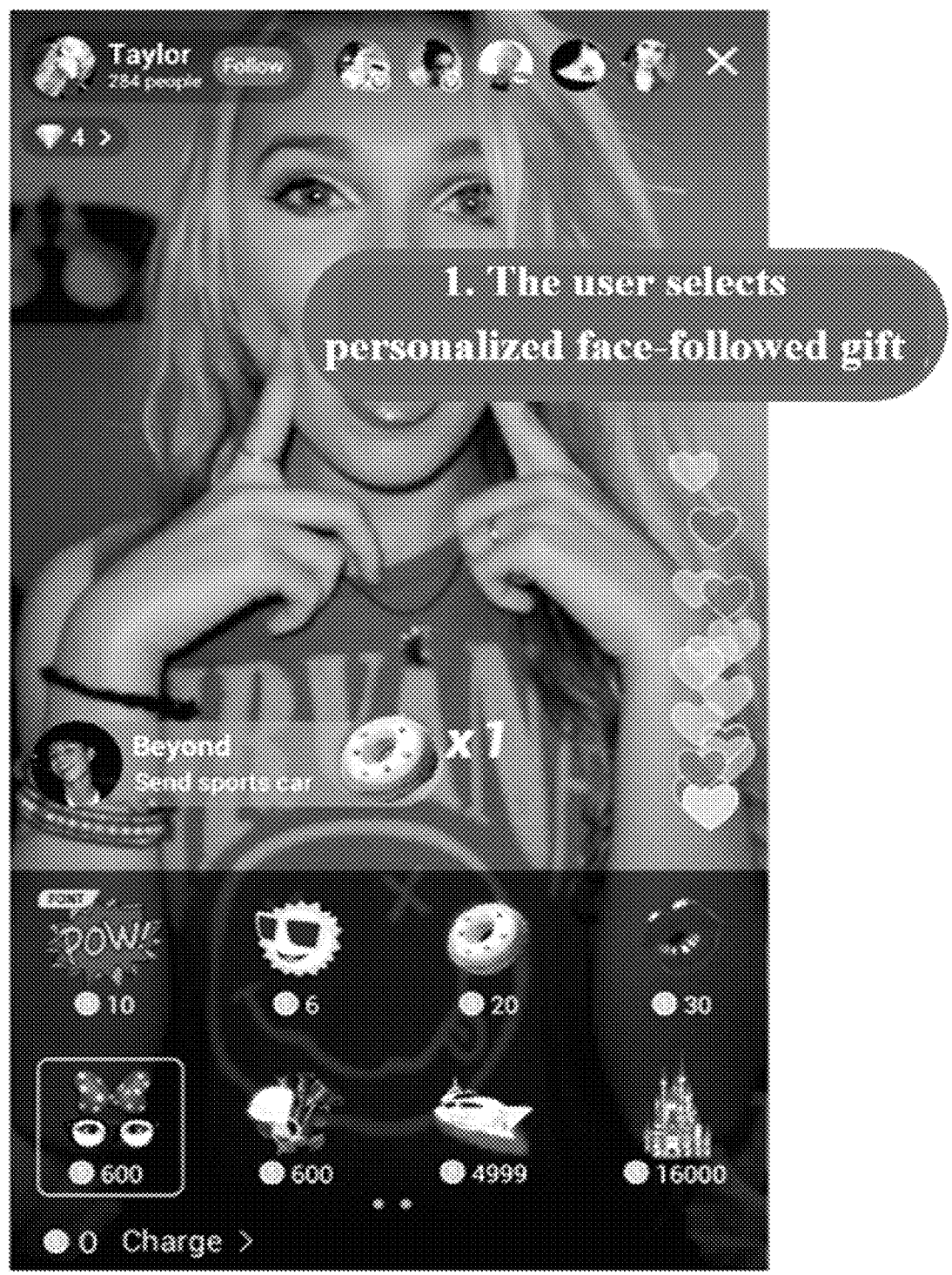
FIGS. 6a-6c are schematic diagrams illustrating generation of a virtual gift of a dynamic expression category according to an embodiment of the present disclosure.
Figure 6B:
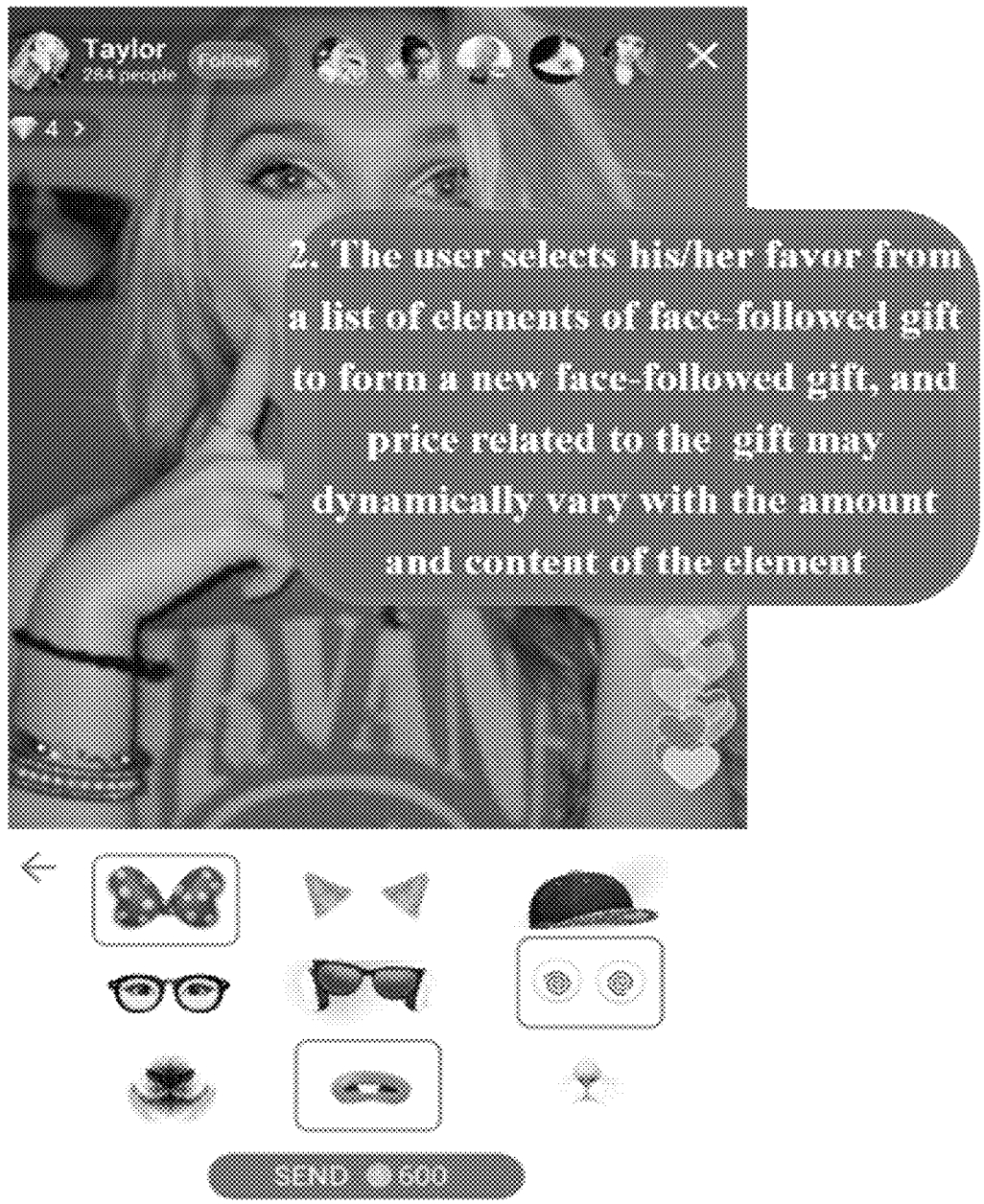
Figure 6C:
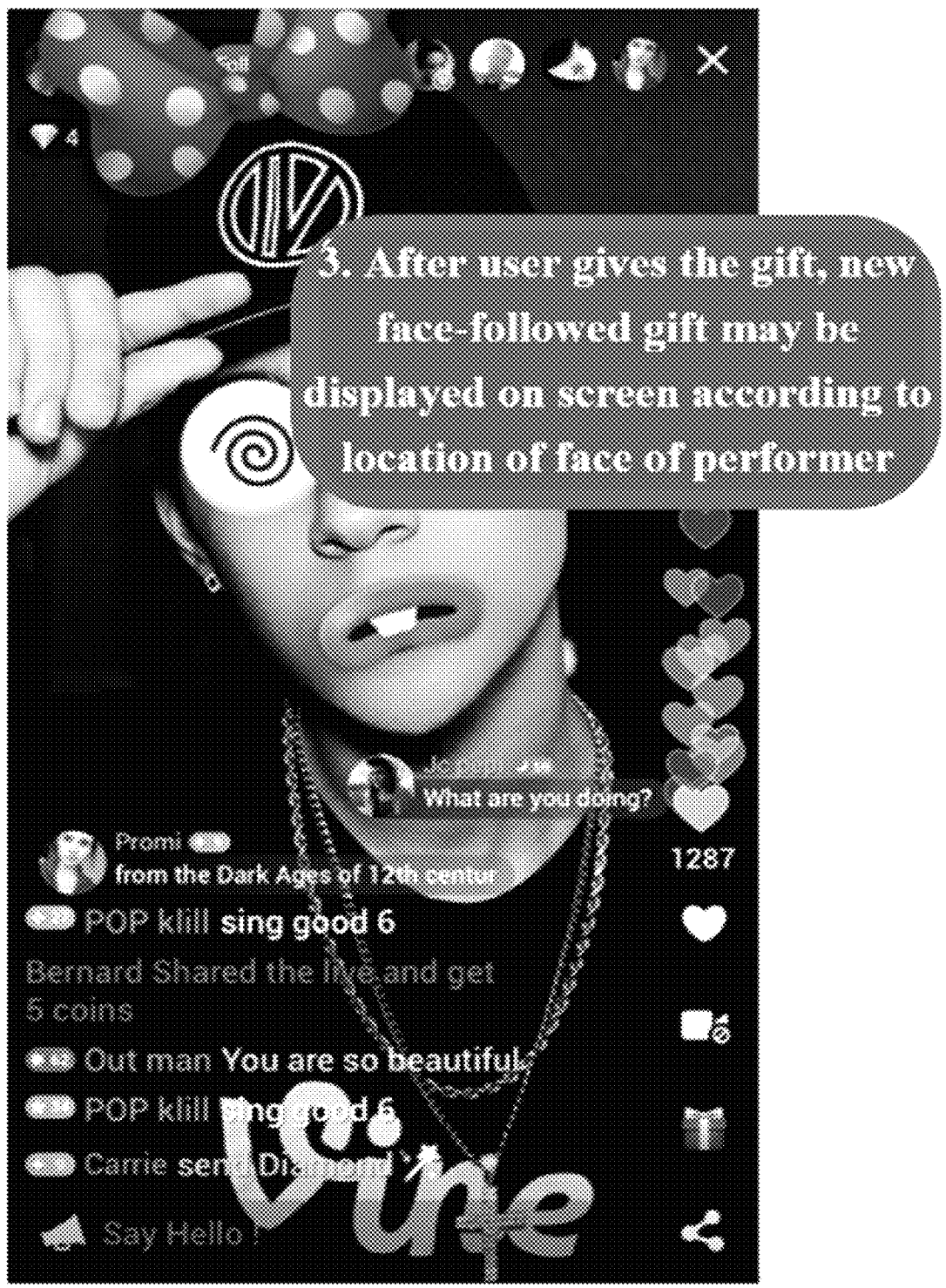

For example, when it is detected that the user clicks an entrance of gifts on an interface of the live show and accesses a gift list, and after the user selects a personalized face-followed gift, a bouncing window of related gift template may be automatically popped up on the interface for editing virtual gifts. There may be various different gift elements systematically predetermined contained on the bouncing window. The gift elements may be classified into different classifications, such as eye, mouth, ear, cheek, a section above the head or the like. The user may select respectively an element from some or all different classifications and combine them. After the combination is satisfied by the user by previewing, the virtual gift may be generated and displayed on the screen showing the live show, as illustrated in FIGS. 6a-6c.

With the method for recommending the virtual gift for the live show according to embodiments of the present disclosure, the corresponding interface for editing virtual dynamic expressions may be generated according to the dynamic expression gift category selected by the user. The edition operation may be performed according to the target dynamic expression template selected by the user. The user may be able to perform the personalized edition operation according to his/her own needs, to generate a personalized gift carrying a unique feeling, thereby improving the user's experience, increasing the positivity of the user for using the related product and enhancing the stickiness between the user and the related product.

It may be understood that, an aim for personalizing the gift is to dynamically adjust a virtual price of the gift, achieving an aim that a virtual attribute value, i.e., the virtual price of the virtual gift, may be adjusted flexibly, simultaneously reducing workload and complexity of developing a gift of the related product. Therefore, the type and the amount of virtual gifts may be enriched, and user's interest of participation and interaction may be greatly improved. The virtual attribute value may also be displayed together with the virtual gift, for preview. Accordingly, in an embodiment of the present disclosure, when the virtual gift is generated according to the input content, the method for recommending the virtual gift for the live show may also include determining the virtual attribute value of the virtual gift according to the input content. For example, there may be a list between the input content and the virtual attribute value. The list may include such as, price corresponding to amount of words, price corresponding to dynamic expression, or the like. The virtual attribute value may be a virtual coin price, a user experience value, and/or a virtual score.

For example, when the virtual gift is generated, the virtual coin price (and/or the user experience value, and/or a virtual score) required by generating the virtual gift may be dynamically adjusted according to the amount of words input by the user and the selected target character-graphics template format, or according to the number and format of the gift elements selected by the user, to provide different selections with different price levels for the user. Therefore, the user may customize the gift according to the user's actual affordable ability, thereby making atmosphere of the live show enjoyable.

To achieve the above embodiments, the present disclosure also provides a device for recommending a virtual gift for a live show.

Figure 7:
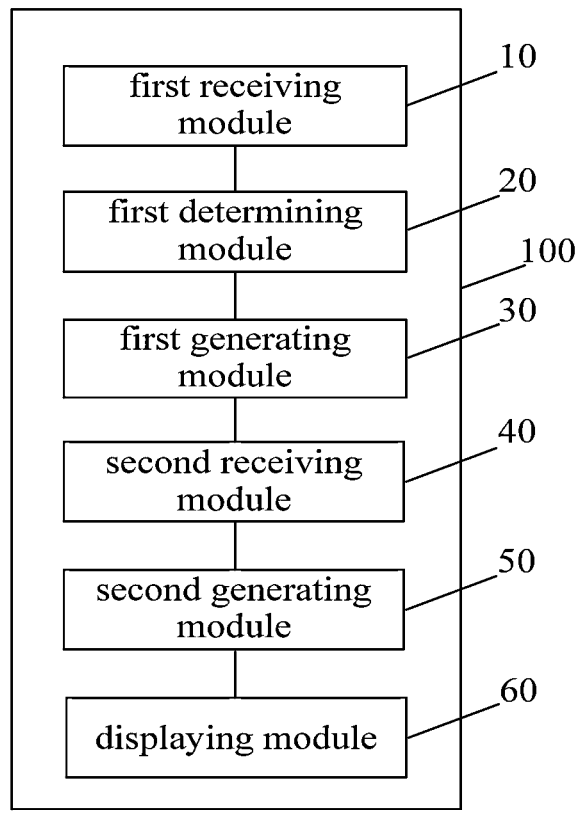
FIG. 7 is a block diagram illustrating a device for recommending a virtual gift for a live show according to an embodiment of the present disclosure.

FIG. 7 is a block diagram illustrating a device for recommending a virtual gift for a live show according to an embodiment of the present disclosure.

As illustrated in FIG. 7, the device 100 for recommending the virtual gift for the live show according to embodiments of the present disclosure may include a first receiving module 10, a first determining module 20, a first generating module 30, a second receiving module 40, a second generating module 50 and a displaying module 60.

In detail, the first receiving module 10 may be configured to receive a clicking instruction from a user on a gift list of the live show.

For example, it is assumed that the device for recommending the virtual gift for the live show may be implemented by a mobile terminal. The mobile terminal may provide an application of the live show for a user. The user may watch a live show through the application, and may present a gift to a performer when watching the live show, to show love and support to the presenter. In order to realize interaction between the user and the performer, the mobile terminal may provide an of virtual gifts to the user during the live show through the application. When it is detected that the user clicks and accesses the entrance of virtual gifts, a gift list may be provided to the user. The gift list includes various categories of virtual gifts, such as, gift of a character category, gift of a static expression category, gift such as flowers, or the like. In the way, the user may click the gift list displayed on the interface showing the live show to give a gift to the performer when the user desires to give gifts to the performer.

It should be noted that, in embodiments of the present disclosure, the mobile terminal may be, but not limited to, a smart terminal having a network communication function, such as a smart phone, a personal digit assistant, a PC (personal computer), a table computer.

The first determining module 20 may be configured to determine a gift category according to the clicking instruction. It may be understood that, the gift list of the live show may include various categories of virtual gifts. In this way, the user may freely select the virtual gift according to his/her own needs. Therefore, when the clicking instruction from the user on the gift list of the live show is detected and a determination is made, the category of the gift selected by the user may be determined according to the clicking instruction.

The gift category may be a character-graphics gift category, and may also be a dynamic expression gift category.

The above various gift categories may enable a selection by the user according to his/her own needs to meet different needs of the user.

The first generating module 30 may be configured to generate an interface for editing virtual gifts according to the gift category.

In detail, after the gift category selected by the user is determined, the interface for editing virtual gifts may be generated according to the gift category. For example, the interface for editing virtual gifts may be generated in following ways, which is not limited thereto.

A first way: when the gift category selected by the user is the character-graphics gift category, an interface for editing virtual characters may be generated according to the character-graphics gift category. The interface for editing virtual characters may contain an input box and a plurality of character-graphics template formats.

A second way: when the gift category selected by the user is a dynamic expression gift category, an interface for editing virtual dynamic expressions may be generated according to the dynamic expression gift category. The interface for editing virtual dynamic expressions may contain a plurality of dynamic expression templates.

Certainly, when the interface for editing virtual gifts needs to be generated according to the gift category, an interface for editing virtual gifts of the character-graphics gift category and the dynamic expression gift category in combination may be generated according to the character-graphics gift category and the dynamic expression gift category.

The second receiving module 40 may be configured to receive an input content input by the user through the interface for editing virtual gifts. In detail, after the interface for editing virtual gifts is generated according to the gift category, the interface for editing virtual gifts may be displayed on the screen showing the live show. The user may edit the selected gift through the interface for editing virtual gifts, to input his/her favorite content information. For example, when the selected gift category is the character-graphics gift category, the user may input the character-typed content to the interface for editing virtual characters. As another example, when the selected gift category is the dynamic expression gift category, the user may input dynamic-expression-typed content to the interface for editing virtual dynamic expressions. Certainly, a gift combined of the character and the dynamic expression may also be selected, and the user may provide inputs through the interface for editing the virtual gifts in combination the combination, such that the user may provide corresponding content according to the user's feeling or a scene.

The second generating module 50 may be configured to generate a virtual gift according to the input content.

As an example, the interface for editing virtual gifts may also provide a preview function of the virtual gifts to the user. For example, a preview button may be provided on the interface for editing virtual gifts. After it is detected that the user inputs his/her favorite content to the interface for editing virtual gifts, and when it is determined that the user clicks the preview button, the generated virtual gift may be displayed on the interface for editing virtual gifts for preview. As another example, at the same time when it is detected that the user inputs his/her favorite content to the interface for editing virtual gifts, generation of the virtual gift with input may be displayed on the interface for editing virtual gifts in real time, to realize a real-time preview function. In this way, it is possible to secondarily edit an edited gift in real time until the gift is satisfied by the user, when the user does not satisfy with the edited gift. Further, the user may click a save button on the interface for editing virtual gifts to save the generated virtual gift.

The displaying module 60 may be configured to display the virtual gift on a screen showing the live show.

As an example, after the virtual gift is generated according to the input content, the virtual gift may be directly displayed on the screen showing the live show, such that the gift presenter, the performer and other users may see the virtual gift. As another example, after the virtual gift is generated according to the input content, and when a determination instruction on the virtual gift sent from the user is received, the virtual gift may be directly displayed on the screen showing the live show.

According to the device for recommending the virtual gift for the live show, the clicking instruction from the user on the gift list of the live show is received, the gift category is determined according to the clicking instruction, the interface for editing virtual gifts is generated according to the gift category, the input content input by the user is received; and the virtual gift is generated according to the input content. Limited gift templates may be edited secondarily, to create a new virtual gift. Therefore, not only the gift format is enriched, but also the user is enabled to casually edit the gift template based on his/her own needs, thereby improving user's experience, increasing positivity of the user for using a related product and enhancing stickiness between the user and the related product.

In order to enable the technical features in embodiments of the present disclosure to be more clear and easily understood, the above technical solution may be described in detail, in which the interface for editing virtual gifts may be generated according to the gift category selected by the user and the virtual gift is generated by performing the edition on the interface for editing virtual gifts by the user.

In an embodiment of the present disclosure, the first generating module 30 may be configured to generate a corresponding interface for editing virtual gifts, when the gift category is the character-graphics gift category. The corresponding interface for editing virtual gifts may contain an input box and a plurality of character-graphics template formats.

It should be understood that, when it is determined that the gift category selected by the user is the character-graphics gift category, a corresponding interface for editing virtual characters may be generated, and the interface for editing virtual characters is displayed on the screen showing the live show. The user may perform edition and selection operation through the input box and on the plurality of character-graphics template formats on the interface for editing virtual characters, thereby performing an operation according to his/her need. Therefore, the user may better express the user's favor.

The second receiving module 40 may be further configured to receive the input content input by the user through the input box, and determine a target character-graphics template format selected by the user from the plurality of character-graphics template formats.

In detail, receiving the input content input by the user through the input box, and determining the target character-graphics template format from the plurality of character-graphics template formats may be implemented by following examples.

A first example: after it is determined that the user inputs contents to the input box on the interface for editing virtual characters, the user may be firstly prompted to select the target character-graphics template format from the plurality of character-graphics template formats.

A second example, before the user performs content edition on the interface for editing virtual characters, the user may be prompted to select the target character-graphics template format from the plurality of character-graphics template formats, and the user may be prompted to input the content through the input box.

It should be understood that, the above implementations are merely exemplary, which are not construed as limitations of embodiments of the present disclosure.

It should be illustrated that, the content input by the user to the input box may be a character symbol, an English symbol, an emoji or the like.

In order to protect the network language civilization, in an embodiment of the present disclosure, the detailed procedure of receiving the input content input by the user through the input box by the second receiving module 40 may include following. The content input by the user to the input box may be filtered based on a rule, to determine the input content. For example, when the user inputs the content through the input box, sensitive words may be filtered out from the content. When it is detected that the content input by the user contains a sensitive word, the sensitive word may be filtered out. For example, the sensitive word may be replaced by a default word. The content obtained after the filtering may be determined as the input content. A prompt message may be generated and provided to the user, to prompt the user that the content currently input contains sensitive information. Therefore, the civilized atmosphere of the live show platform may be ensured.

The second generating module 50 may be further configured to generate the virtual gift according to the input content input by the user through the input box and the target character-graphics template format.

As an example, the interface for editing virtual characters may also provide a preview function of the virtual gifts to the user. For example, a preview button may be provided on the interface for editing virtual characters. When it is detected that the user inputs his/her favorite content on the interface for editing virtual characters and determines the target character-graphics template format, and when it is determined that the user clicks the preview button, the generated virtual gift may be displayed on the interface for editing virtual characters for preview. As another example, at the same time when it is detected that the user inputs his/her favorite content on the interface for editing virtual characters and the target character-graphics template format is determined, generation of the virtual gift with the input may be displayed on the interface for editing virtual gifts in real time, to realize a real-time preview function. In this way, it is possible to secondarily edit an edited gift in real time until the gift is satisfied by the user, when the user does not satisfy with the edited gift. Further, the user may click a save button on the interface for editing virtual gifts to save the generated virtual gift.

It should be noted that, in order to ensure a good displaying effect of the gift on the interface, an upper limit of the number of characters may be 8.

The displaying module 60 may be configured to display the virtual gift on a screen showing the live show.

For example, when it is detected that the user clicks an entrance of gifts on an interface of the live show and accesses a gift list, and after the user selects a personalized character-graphics gift, a bouncing window may be automatically pushed on the interface for editing virtual gifts, including an input box of characters. The user may input his/her desired character to the input box. A gift preview may be provided above the input box, displaying the effect in real time for previewing by the user. The virtual gift may be generated after the user satisfies with the effect and may be displayed on the screen showing the live show, as illustrated in FIGS. 5a-5c.

In another embodiment of the present disclosure, the first generating module 30 may be further configured to generate a corresponding interface for editing virtual gifts, when the gift category is a dynamic expression gift category. The corresponding interface for editing virtual gifts may contain a plurality of dynamic expression templates.

It should be understood that, when it is determined that the gift category selected by the user is the dynamic expression gift category, a corresponding interface for editing virtual dynamic expressions may be generated. The interface for editing virtual dynamic expressions may be displayed on the screen showing the live show. The user may perform edition and selection operation on the plurality of dynamic expression templates displayed on the interface for editing virtual dynamic expressions. The user may perform an operation according to his/her need, such that the user may better express what the user wants to express.

The second receiving module 40 may be further configured to receive a target dynamic expression template selected by the user from the plurality of dynamic expression templates.

In detail, when it is determined that the user selects the target dynamic expression template, a block of generating the virtual gift may be performed according to the target dynamic expression template selected by the user. When the user selects the target dynamic expression template, the user may perform the selection based on the user's feeling. For example, when the user desires to express happiness, the user may select a dynamic expression of smiling. As another example, when the user desires to express sadness, the user may select a dynamic expression of crying.

The second generating module 50 may be further configured to generate the virtual gift according to the target dynamic expression template.

As an example, the interface for editing virtual dynamic expressions may also provide a preview function of the virtual gifts to the user. For example, a preview button may be provided on the interface for editing virtual dynamic expressions. When it is detected that the user determines the target dynamic expression template on the interface for editing virtual dynamic expressions and when the user clicks the preview button, the generated virtual gift may be displayed on the interface for editing virtual dynamic expressions for preview. As another example, at the same time when it is detected that the user determines the target dynamic expression template on the interface for editing virtual dynamic expressions, generation of the virtual gift with the input may be displayed on the interface for editing virtual gift in real time, to realize a real-time preview function. In this way, it is possible to edit an edited gift twice in real time until the gift is satisfied by the user, when the user does not satisfy with the edited gif. Further, the user may click a save button on the interface for editing virtual gifts to save the generated virtual gift.

Figure 8:
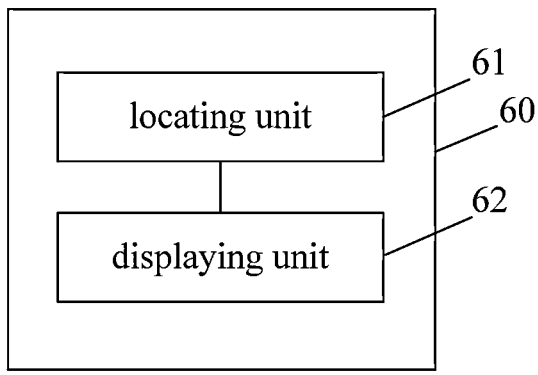
FIG. 8 is a block diagram illustrating a displaying module according to an embodiment of the present disclosure.

The displaying module 60 may be configured to display the virtual gift on the screen showing the live show. In an embodiment of the present disclosure, as illustrated in FIG. 8, the displaying module 60 may further include: a locating unit 61 and a displaying unit 62. The locating unit 61 may be configured to obtain location information by locating a face on the screen showing the live show.

In detail, in an embodiment of the present disclosure, the locating unit 61 may be configured to locate the face of a performer on the screen showing the live show using coordinate information of the face of the performer on the screen showing the live show, to obtain the location information.

The displaying unit 62 may be configured to display the virtual gift on the screen showing the live show according to the location information.

As an example, after the virtual gift is generated, the locating unit 61 may be configured to obtain the location information by locating the face of the performer on the screen showing the live show. The displaying unit 62 may be configured to display the virtual gift on the screen showing the live show according to the location information. As another example, after the virtual gift is generated according to the input content, when a determination instruction of the virtual gift sent from the user is received by the displaying unit 62, the virtual gift may be directly displayed on the screen showing the live show according to the location information of the face on the screen showing the live show obtained by the locating unit 61.

For example, when it is detected that the user clicks an entrance of gifts on an interface of the live show and accesses a gift list, and after the user selects a personalized face-followed gift, a bouncing window of related gift template may be automatically popped up on the interface for editing virtual gifts. There may be various different gift elements systematically predetermined contained on the bouncing window. The gift elements may be classified into different classifications, such as eye, mouth, ear, cheek, section above the head or the like. The user may select respectively an element from some or all different classifications and combine them. After the combination is satisfied by the user by previewing, the virtual gift may be generated and displayed on the screen showing the live show, as illustrated in FIGS. 6a-6c.

With the device for recommending the virtual gift for the live show according to embodiments of the present disclosure, the interface for editing virtual gifts may be generated according to the gift category selected by the user, and the edition operation may be performed according to the content input by the user and the template format selected by the user, such that the user may perform a personalized edition operation according to his/her own needs, to generate a personalized gift carrying a unique feeling, thereby improving the user's experience, increasing the positivity of the user for using the related product and enhancing the stickiness between the user and the related product.

Figure 9:
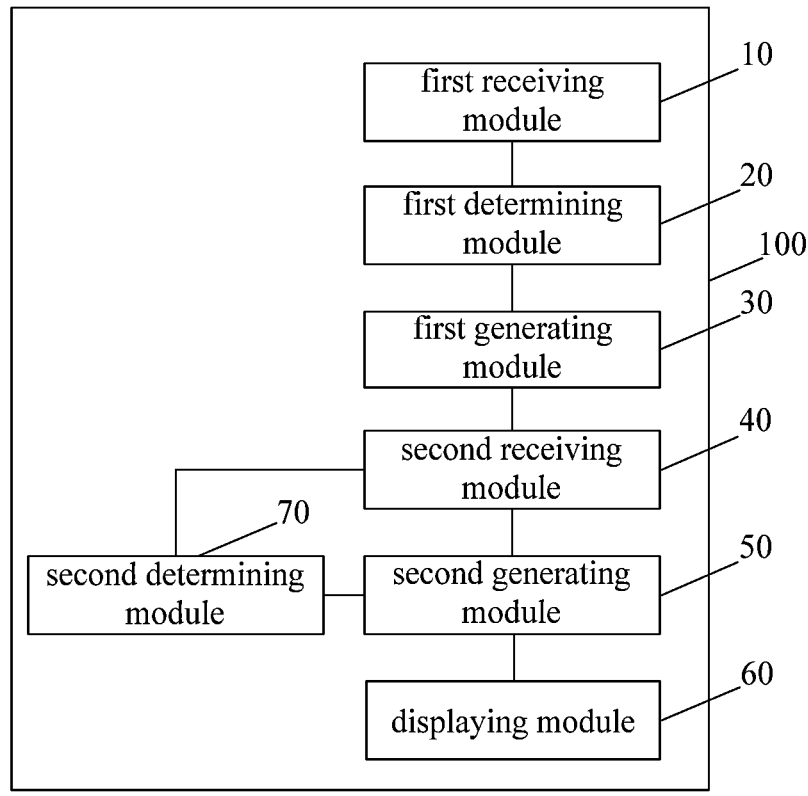
FIG. 9 is a block diagram illustrating a device for recommending a virtual gift for a live show according to another embodiment of the present disclosure.

It may be understood that, an aim for personalizing the gift is to dynamically adjust a virtual price of the gift, achieving an aim that a virtual attribute value, i.e., the virtual price of the virtual gift may be adjusted flexibly, simultaneously reducing workload and complexity for developing a gift of the related product. Therefore, the type and the amount of virtual gifts may be enriched, and user's interest of participation and interaction may be greatly improved. The virtual attribute value may also be displayed together with the virtual gift, for preview. Accordingly, in an embodiment of the present disclosure, as illustrated in FIG. 9, on the basis of FIG. 7, the device may also include a second determining module 70. The second determining module 70 may be configured to determine the virtual attribute value of the virtual gift according to the input content, when the virtual gift is generated according to the input content by the second generating module 50. For example, there may be a list between the input content and the virtual attribute value. The list may include such as, price corresponding to amount of words, price corresponding to dynamic expression, etc.

The virtual attribute value may be a virtual coin price, a user experience value, and/or a virtual score.

For example, when the virtual gift is generated by the second generating module 50, the second determining module 70 may be configured to dynamically adjust the virtual coin price (and/or the user experience value, and/or a virtual score) required for generating the virtual gift according to the amount of words input by the user and the selected target character-graphics template format, or according to the number and format of the gift elements selected by the user, to provide different selections with different price levels for the user. Therefore, the user may customize the gift according to the user's actual affordable ability, thereby making atmosphere of the live show enjoyable.

Embodiments of a mobile terminal embodiment provided in the present disclosure will be described in detail below. The mobile terminal may be configured to execute the device embodiment for recommending the virtual gift for the live show in the present disclosure. For details which are not disclosed in the embodiments related to the mobile terminal of the present disclosure, the device embodiment for recommending the virtual gift for the live show according to the present disclosure may be referred to.

Figure 10:
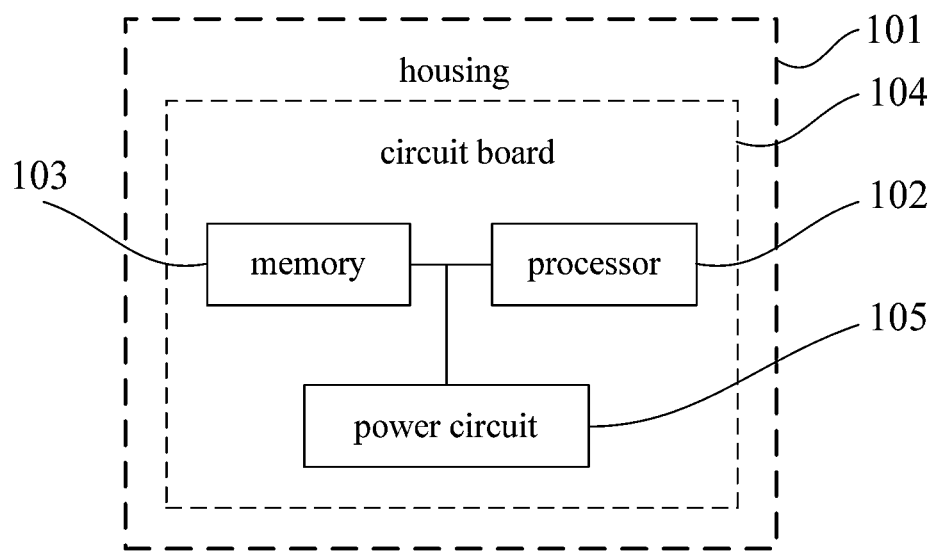
FIG. 10 is a block diagram illustrating a mobile terminal according to an embodiment of the present disclosure.

FIG. 10 is a block diagram illustrating a mobile terminal according to an embodiment of the present disclosure. As illustrated in FIG. 10, the mobile terminal may include a housing 101, a processor 102, a memory 103, a circuit board 104 and a power circuit 105. The circuit board 104 may be enclosed by the housing 101. The processor 102 and the memory 103 may be provided on the circuit board 104. The power circuit 105 may be configured to provide power for respective circuits and components of the mobile terminal. The memory 103 may be configured to store executable program codes. The processor 102 may be configured to execute programs corresponding to the executable program codes by reading the executable program codes stored in the memory 103, to execute following.

At block S1001', a clicking instruction from a user on a gift list of a live show is received.

At block S1002', a gift category is determined according to the clicking instruction.

At block S1003', an interface for editing virtual gifts is generated according to the gift category.

At block S1004', an input content input by the user through the interface for editing virtual gifts is received.

At block S1005, a virtual gift is generated according to the input content.

To achieve the above embodiments, the present disclosure further provides a storage medium. The storage medium is configured to store an application. The application is configured to execute the method for recommending a virtual gift for a live show according to any one of the above embodiments of the present disclosure when running.

Other embodiments of the present disclosure will be readily apparent to those skilled after considering the specification disclosed herein and practicing the present disclosure. This application is intended to cover any variations, usages, or adaptations of the present disclosure. The variations, usages, or adaptations may follow general principles of the present disclosure and may include common knowledge or conventional technical means in the art of field that are not disclosed in the present disclosure. The specification and embodiments are merely exemplary, and actual scope and spirit of the present disclosure are disclosed by following appended claims.

It should be understood that, the present disclosure is not limited to an accuracy structure described above and illustrated in the accompanying drawings, and various modification and changes may be performed thereon without departing from the scope. The scope of the present disclosure may be limited by appended claims.

What is claimed is:

1. A method for recommending a virtual gift for a live show, applicable for a mobile terminal, which is configured to provide an application of a live show for a user, to show the live show through the application, the method comprising:
   receiving a clicking instruction from a user on a gift list of the live show;
   determining a gift category according to the clicking instruction;
   generating an interface for editing virtual gifts according to the gift category, and displaying the interface for editing virtual gifts on a screen of the mobile terminal showing the live show, wherein different gift categories correspond different interfaces for editing virtual gifts, the interfaces for editing virtual gifts comprises an interface for editing virtual characters and an interface for editing virtual dynamic expressions, in a case that the gift category is a character-graphics gift category, the interface for editing virtual characters is displayed on the screen of the mobile terminal showing the live show, the interface for editing virtual characters contains an input box for receiving the input content input by the user and a plurality of character-graphics template formats for allowing the user to select a target character-graphics template format, and in a case that the gift category is a dynamic expression gift category, the interface for editing virtual dynamic expressions is displayed on the screen of the mobile terminal showing the live show, the interface for editing virtual dynamic expressions_contains a plurality of dynamic expression templates for allowing the user to select a target dynamic expression template;
   receiving an input content input by the user through the interface for editing virtual gifts, wherein in a case that the gift category is the character-graphics gift category, edition and selection operations are performed by the user via the mobile terminal through the input box and on the plurality of character-graphics template formats of the interface for editing virtual characters, in a case that the gift category is the dynamic expression gift category, edition and selection operations are performed by the user via the mobile terminal on the plurality of dynamic expression templates displayed on the interface for editing virtual dynamic expressions;
   recommending and generating the virtual gift according to the input content, and displaying the generated virtual gift on the interface for editing virtual gifts for preview;
   obtaining location information by locating a face on the screen showing the live show; and
   displaying the virtual gift on the screen showing the live show according to the location information.

2. The method according to claim 1, in response to recommending and generating the virtual gift according to the input content, further comprising:
   determining a virtual attribute value of the virtual gift according to the input content.

3. The method according to claim 2, wherein, the virtual attribute value is at least one of a virtual coin price, a user experience value, and a virtual score.

4. The method according to claim 1, wherein, in response to determining that the gift category is a character-graphics gift category, the interface for editing virtual gifts contains an input box and a plurality of character-graphics template formats;
  in which, receiving the input content input by the user through the interface for editing virtual gifts comprises:
    receiving the input content input by the user through the input box, and determining a target character-graphics template format selected by the user from the plurality of character-graphics template formats; and
  in which, recommending and generating the virtual gift according to the input content comprises:
    recommending and generating the virtual gift according to the input content input by the user through the input box and the target character-graphics template format.

5. The method according to claim 4, wherein, receiving the input content input by the user through the input box comprises:
  filtering content input by the user to the input box based on a rule, to determine the input content.

6. A mobile terminal, comprising: a housing, a processor, a memory, a circuit board and a power circuit, in which, the circuit board is enclosed by the housing, the processor and the memory are provided on the circuit board, the power circuit is configured to provide power for respective circuits and components of the mobile terminal, the memory is configured to store executable program codes, and the processor is configured to run programs corresponding to the executable program codes by reading the executable program codes stored in the memory, to:
  receive a clicking instruction from a user on a gift list of a live show;
  determine a gift category according to the clicking instruction;
  generate an interface for editing virtual gifts according to the gift category, and display the interface for editing virtual gifts on a screen of the mobile terminal showing the live show, wherein different gift categories correspond different interfaces for editing virtual gifts, the interfaces for editing virtual gifts comprises an interface for editing virtual characters and an interface for editing virtual dynamic expressions, in a case that the gift category is a character-graphics gift category, the interface for editing virtual characters is displayed on the screen of the mobile terminal showing the live show, the interface for editing virtual characters contains an input box for receiving the input content input by the user and a plurality of character-graphics template formats for allowing the user to select a target character-graphics template format, and in a case that the gift category is a dynamic expression gift category, the interface for editing virtual dynamic expressions is displayed on the screen of the mobile terminal showing the live show, the interface for editing virtual dynamic expressions contains a plurality of dynamic expression templates for allowing the user to select a target dynamic expression template;
  receive an input content input by the user through the interface for editing virtual gifts, wherein in a case that the gift category is the character-graphics gift category, edition and selection operations are performed by the user via the mobile terminal through the input box and on the plurality of character-graphics template formats of the interface for editing virtual characters, in a case that the gift category is the dynamic expression gift category, edition and selection operations are performed by the user via the mobile terminal on the plurality of dynamic expression templates displayed on the interface for editing virtual dynamic expressions;
  recommend and generate the virtual gift according to the input content, and display the generated virtual gift on the interface for editing virtual gifts for preview;
  obtain location information by locating a face on the screen showing the live show; and
  display the virtual gift on the screen showing the live show according to the location information.

7. A non-transitory computer readable storage medium, configured to store an application, wherein, when the application is running, the application is configured to:
  receive a clicking instruction from a user on a gift list of the live show;
  determine a gift category according to the clicking instruction;
  generate an interface for editing virtual gifts according to the gift category, and display the interface for editing virtual gifts on a screen of the mobile terminal showing the live show, wherein different gift categories correspond different interfaces for editing virtual gifts, the interfaces for editing virtual gifts comprises an interface for editing virtual characters and an interface for editing virtual dynamic expressions, in a case that the gift category is a character-graphics gift category, the interface for editing virtual characters is displayed on the screen of the mobile terminal showing the live show, the interface for editing virtual characters contains an input box for receiving the input content input by the user and a plurality of character-graphics template formats for allowing the user to select a target character-graphics template format, and in a case that the gift category is a dynamic expression gift category, the interface for editing virtual dynamic expressions is displayed on the screen of the mobile terminal showing the live show, the interface for editing virtual dynamic expressions contains a plurality of dynamic expression templates for allowing the user to select a target dynamic expression template;
  receive an input content input by the user through the interface for editing virtual gifts, wherein in a case that the gift category is the character-graphics gift category, edition and selection operations are performed by the user via the mobile terminal through the input box and on the plurality of character-graphics template formats of the interface for editing virtual characters, in a case that the gift category is the dynamic expression gift category, edition and selection operations are performed by the user via the mobile terminal on the plurality of dynamic expression templates displayed on the interface for editing virtual dynamic expressions;
  recommend and generate the virtual gift according to the input content, and display the generated virtual gift on the interface for editing virtual gifts for preview;
  obtain location information by locating a face on the screen showing the live show; and
  display the virtual gift on the screen showing the live show according to the location information.

8. The mobile terminal according to claim 6, wherein when the virtual gift is recommended and generated according to the input content, the processor is further configured to:
  determine a virtual attribute value of the virtual gift according to the input content.

9. The mobile terminal according to claim 8, wherein the virtual attribute value is at least one of a virtual coin price, a user experience value and a virtual score.

10. The method according to claim 1, wherein, in response to determining that the gift category is a dynamic expression gift category, the interface for editing virtual gifts contains a plurality of dynamic expression templates;
    in which, receiving the input content input by the user through the interface for editing virtual gifts comprises:
    receiving a target dynamic expression template selected by the user from the plurality of dynamic expression templates; and
    in which, recommending and generating the virtual gift according to the input content comprises:
    recommending and generating the virtual gift according to the target dynamic expression template.

11. The mobile terminal according to claim 6, wherein in response to determining that the gift category is a character-graphics gift category, the interface for editing virtual gifts contains an input box and a plurality of character-graphics template formats;
    in which, the processor is configured to receive the input content input by the user through the interface for editing virtual gifts by: receiving the input content input by the user through the input box, and determining a target character-graphics template format selected by the user from the plurality of character-graphics template formats; and
    in which, the processor is configured to recommend and generate the virtual gift according to the input content by: recommending and generating the virtual gift according to the input content input by the user through the input box and the target character-graphics template format.

12. The mobile terminal according to claim 7, wherein in response to determining that the gift category is a dynamic expression gift category, the interface for editing virtual gifts contains a plurality of dynamic expression templates;
    in which, the processor is configured to receive the input content input by the user through the interface for editing virtual gifts by: receiving a target dynamic expression template selected by the user from the plurality of dynamic expression templates; and
    in which, the processor is configured to recommend and generate the virtual gift according to the input content by: recommending and generating the virtual gift according to the target dynamic expression template.

13. The mobile terminal according to claim 12, wherein the processor is configured to display the virtual gift on the screen showing the live show by:
    obtaining location information by locating a face on the screen showing the live show; and
    displaying the virtual gift on the screen showing the live show according to the location information.

14. The non-transitory computer readable storage medium according to claim 7, wherein when the application is running, the application is further configured to:
    display the virtual gift on a screen showing the live show.

15. The mobile terminal according to claim 11, wherein the processor is configured to receive the input content input by the user through the input box by:
    filtering content input by the user to the input box based on a rule, to determine the input content.

\* \* \* \* \*